Nov. 17, 1953   H. F. HOBBS   2,659,468
LUBRICATED FRICTION DISK
Filed March 29, 1949   5 Sheets-Sheet 1

Inventor
HOWARD F. HOBBS
By
Young, Emery & Thompson
Attorneys

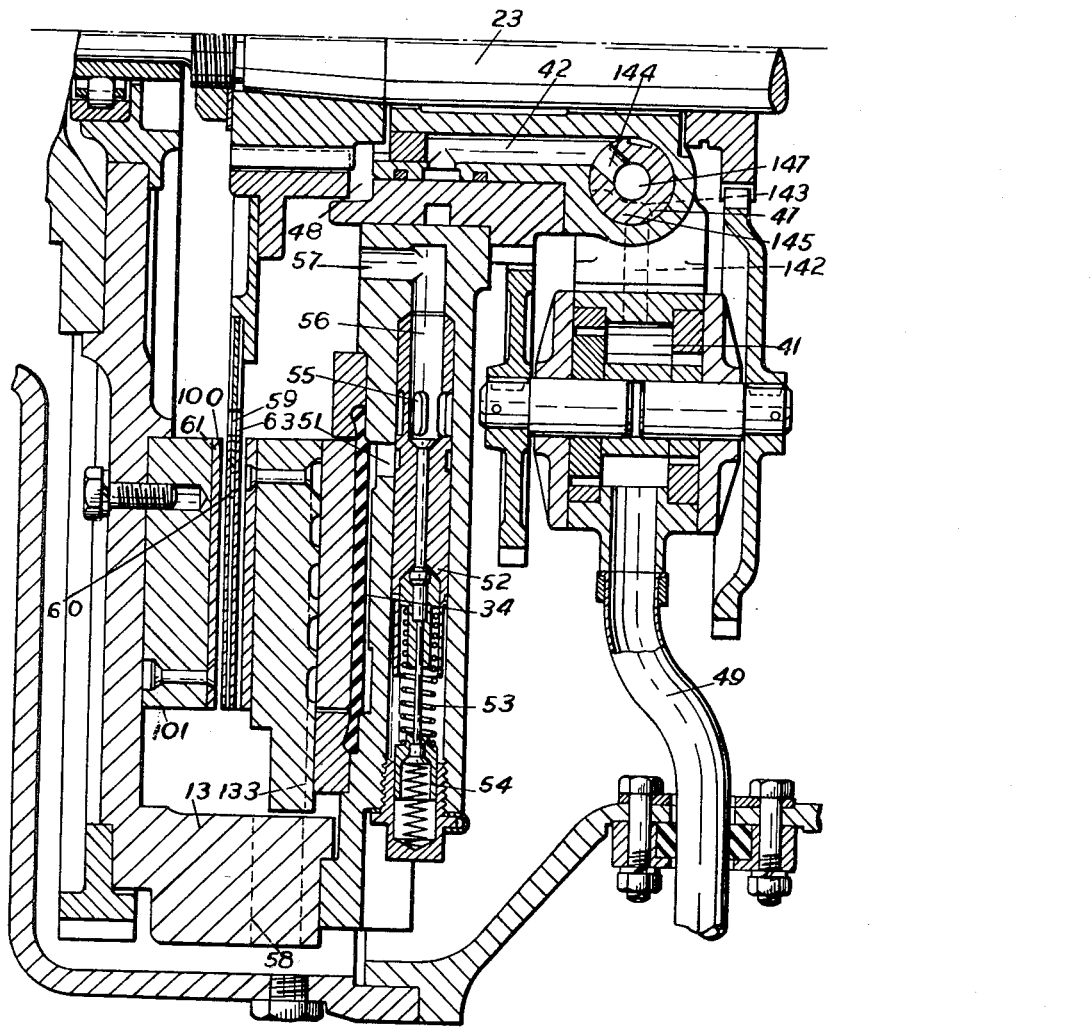

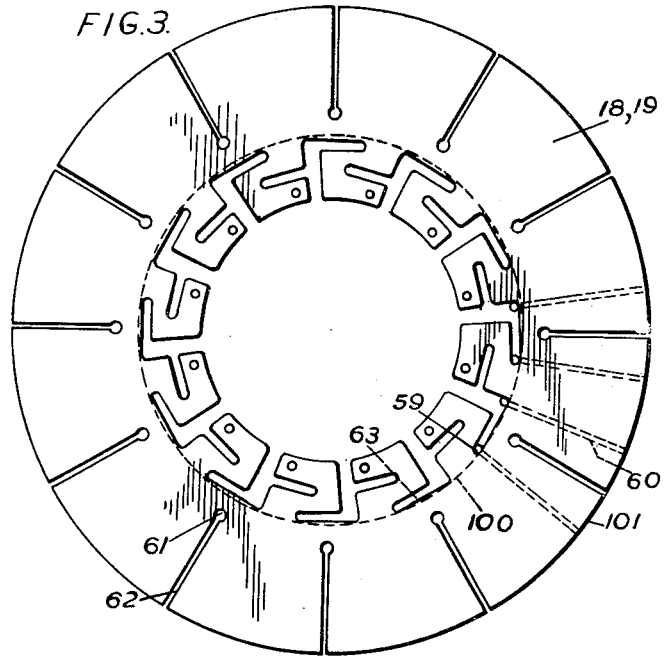
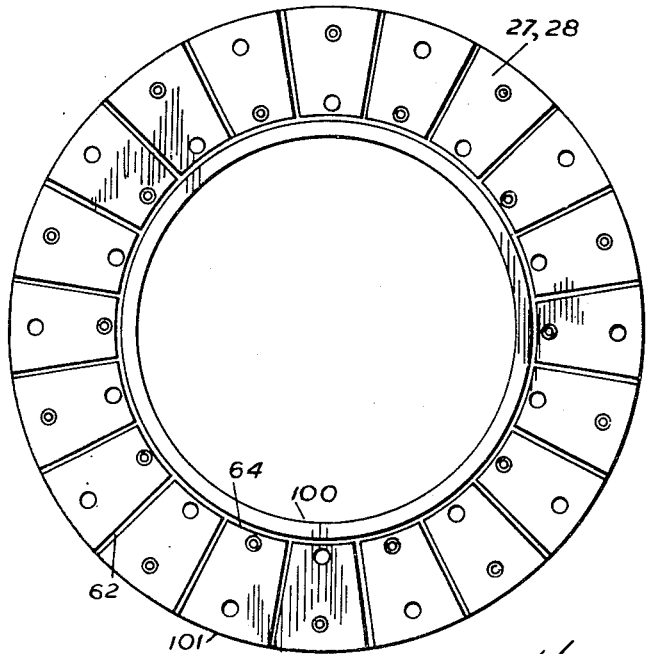

Nov. 17, 1953  H. F. HOBBS  2,659,468
LUBRICATED FRICTION DISK
Filed March 29, 1949  5 Sheets-Sheet 5

*Inventor*
HOWARD F. HOBBS
By Young, Emery &
Thompson
*Attorneys*

UNITED STATES PATENT OFFICE 2,659,468

LUBRICATED FRICTION DISK

Howard Frederick Hobbs, Leamington Spa, England, assignor to Hobbs Transmission Limited, Leamington Spa, England, a British company Application March 29, 1949, Serial No. 84,054

Claims priority, application Great Britain April 2, 1948

4 Claims. (Cl. 192—113)

This invention relates to friction clutches or brakes for use in power transmission apparatus.

In the specification of our prior British Patent No. 596,908 a clutch is described having friction plates made so that oil can escape from between them as they are pressed together and means to supply oil by pressure to the friction faces in a direction to reach the parts of smaller diameter first and in sufficient quantity when all the friction plates are declutched to lubricate the friction surfaces, free escape being provided at the outer peripheries of the friction surfaces and provision being made to cut off or greatly reduce the supply of oil reaching the friction faces during take up and during engagement, an oil escape path large enough in relation to the rate of oil supply so as at all times to prevent an accumulation of a bulk of oil adjacent to the inside edges of the friction surfaces, and hydraulic means including a pump and a flexible diaphragm, the latter being concentric with the clutch axis for pressing said surfaces into contact with a force high enough and applied at such a rate that said surfaces first rotate relatively whilst under the engaging pressure and finally transmit power without relative rotation.

A difficulty with clutches having well lubricated friction surfaces is a tendency to "judder" or to irregularity in torque transmission during the final phase of take up, i. e. when relative speeds are reduced, and just prior to solid drive. The main reason for this is that the friction surfaces provide a very low co-efficient of friction when the relative speeds are great and there is a tendency to rapid and large variation in the co-efficient of friction as the relative speeds of the surfaces are reduced. There is thus considerable variation in the torque transmitted and a tendency to grab. The advantage of lubricating the friction faces is the very smooth action obtained during the initial phase of engagement almost irrespective of engaging load and the extremely low rate of wear.

Asbestos base materials are very suitable for friction faces but are particularly susceptible to the rapidly changing effect referred to. This is probably due to the fact that this class of material is absorbent and carries a relatively large quantity of lubricant. Various clutches have been proposed in which metal plates have been employed, or other materials including cork, the facings being provided with grooves and/or openings of various shapes, the object being to produce the desired smoothness over the whole of the engaging period.

It has now been found that a clutch having friction surfaces arranged so that the entry of oil is prevented or restricted during take up by engagement of smooth continuous surfaces over an area near the parts of smallest diameter and having provision for the removal and escape at the outer diameter of oil from the remainder of the engaging surfaces produces extremely smooth action over the whole phase of engagement. This is due to the fact that during the initial phase of take up the greater part of the oil is removed with a correspondingly rapid increase in the co-efficient which remains fairly constant over the remainder of the engagement.

According to the invention one or more of the friction surfaces of the clutch or brake is provided with one or more slots or grooves which extend across the greater part of the friction surface between the inner and outer peripheries and lead to the outer periphery but not to the inner periphery, a smooth unbroken surface being provided near the inner periphery, whereby when the friction surfaces are pressed into contact entry of oil at the inner diameter is prevented or restricted and oil on the surface is wiped off and expelled by means of the slots or grooves.

The oil supplied for lubricating the surfaces will be fed through an oil duct situate at lesser radius than the inner periphery of the coacting surfaces. The supply of oil may be restricted during take up and engagement or may be continuous, in which case escape ducts will be provided, preventing an accumulation of oil at or near the inner diameters of the friction surfaces. The oil will preferably pass through ducts in the friction plates so as to carry away some of the heat developed at the friction surfaces.

In order that the invention may be readily carried into effect a constructional form thereof will now be described by way of example with reference to the accompanying diagrammatic drawings, wherein:

Figure 2 is the lower half of the same view;

Figure 3 is an axial view of one of the outer plates of the spinner plate shown in Figures 1 and 2;

Figure 4 shows the construction of a clutch spinner plate facing for use alternatively to the spinner plate construction shown in Figure 3;

Figure 1:
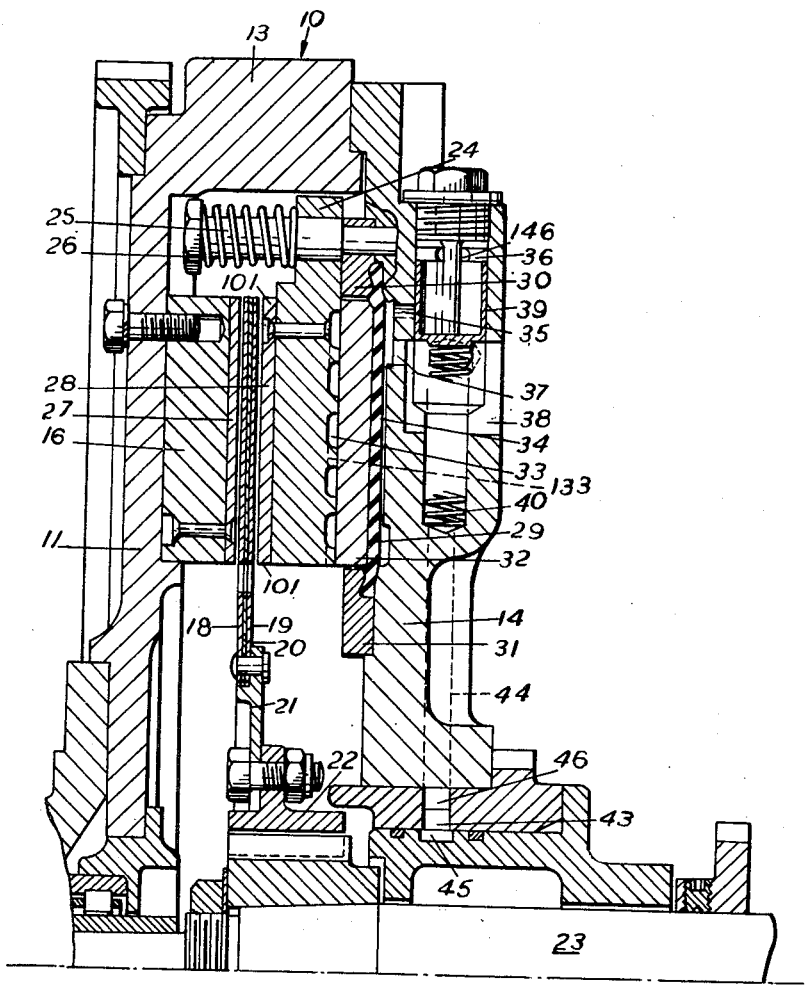
Figure 1 is the upper half of a vertical sectional view of a clutch assembly made in accordance with the present invention.

Referring first to Figure 1 the normal clutch housing 10 of a motor vehicle comprises the usual engine flywheel 11 which is to be attached to the engine crankshaft, and which carries a peripheral flange or rim 13, and a cover plate 14, the whole forming the casing around the friction plates one of which comprises a ring or plate 16 mounted on the flywheel 11, and having a friction facing 27, and the other of which is in the form of an axially movable presser plate 24 provided with a friction facing 28. A spinner plate consists of friction rings 18, 19 separated by plate 20 and rivetted to a steel plate 21 carried by a hub 22 which is splined to a boss carried by the gearbox shaft 23. The spinner plate is disposed between the facings 27, 28, and can be gripped between them. The plate 24 is slidably mounted on pins 25 and springs 26 on these pins serve for pressing the plate 24 in the dis-engaging direction.

For applying pressure to the presser plate 24 to press it towards the ring 16 for engaging the friction surfaces, a flexible diaphragm 29 is provided consisting of a ring which may be made of fabric and a synthetic rubberlike substance. The flexible diaphragm is clamped at its inner and outer margins against the plate 14 by an outer clamping ring 30 and an inner clamping ring 31. A ring 32 of a material of low heat conductance e. g. resin impregnated fabric is mounted in an axially movable manner within the clamping rings and between the diaphragm and presser plate 24. The presser plate 24 has grooves 33 which are connected by slots 133 so that oil can pass through the grooves and slots for the purpose of escape and carrying away of heat from the presser plate and preventing over-heating of the diaphragm.

Oil under pressure can be supplied to a space 34 which is formed by the diaphragm and an annular recess in the plate 14, through an opening 35 which is disposed at the outer part of said space and communicates with the interior of a valve chamber 36. An exhaust opening 37 also leads from the space to the valve chamber, the inner end of the chamber being provided with a slot 38 which opens into the housing surrounding the apparatus. The valve chamber contains a movable valve member 39 pressed outwardly by a spring 40. In the outward position of the valve member the opening 37 provides communication through the slot 38, so that oil can rapidly escape from the space 34 behind the diaphragm aided by centrifugal force on the oil when the clutch is to be disengaged. Fluid under pressure can be supplied from a pump 41 to the outer end of the valve chamber 36 through drillings 142, 143, 144, 42, 43, 44 grooves 145, 45, 46, and port 146. The centrifugal force on the oil in the drilling 44 balances the centrifugal force on the valve member 39 and spring 40 but the additional pump pressure (when applied) moves the valve member inwards to close the communication between 37, 38 and provide communication between 35 and 36, whereby the oil pressure is introduced into the space 34 to move the diaphragm to engage the clutch.

The drilling 44 can be opened to or closed from pressure by means of a valve 47. The valve 47 has a central bore 147 one part of which provides passage for the fluid under pressure, the other part of which forms a bore for a relief valve which comprises a spring pressed piston. Pressure in the bore will move the piston against its spring thereby opening an exhaust duct which may exhaust into the housing of the apparatus or through further drillings similar to 42 not shown, which lead to the space 48. Pump 41 draws fluid from a sump through a suction pipe 49, the sump being connected to the housing so that fluid exhausted into the housing will flow into the sump.

The space 34 has an exhaust 51 (Figure 2) controlled by a centrifugally acting valve 52. The valve is urged inwards by springs 53, 54 and is provided with ducts 55, 56, leading to exhaust drillings 57. Over some predetermined range of idling speeds the ducts 55 align with the exhaust 51 thereby allowing escape of pressure from the space 34 so as to cause the clutch to be automatically disengaged over the range of idling speeds. The centrifugal force at increased speeds causes the valve to move outwards against the springs thereby closing the exhaust 51. When the clutch is disengaged, fluid delivered by the pump will circulate through the parts of the clutch from the drilling 57 and/or from the space 48. Some of the fluid will pass between the disengaged friction surfaces thereby providing the desired lubrication and some through the grooves 33. Holes 58 are provided to allow the fluid to escape into the housing.

Figure 5:
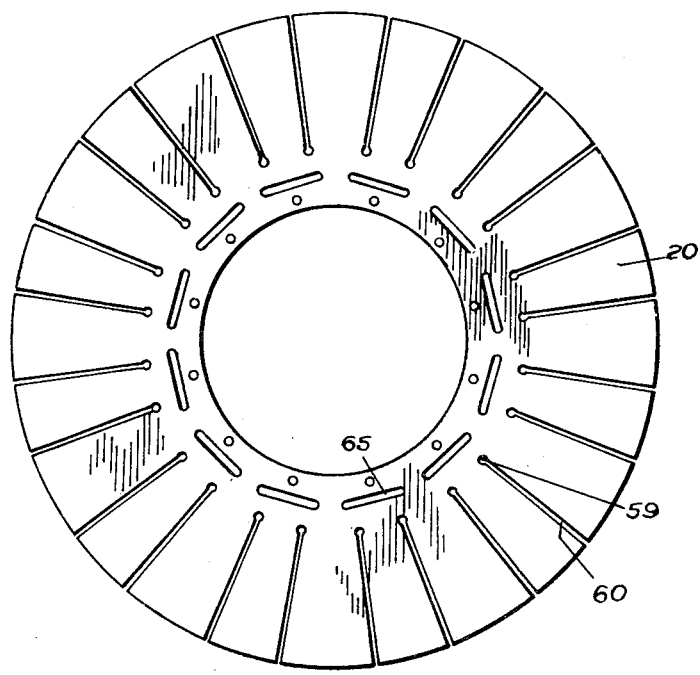
Figure 5 shows the construction of the central plate in the clutch spinner plate shown in Figures 1 and 2.
Figure 6:
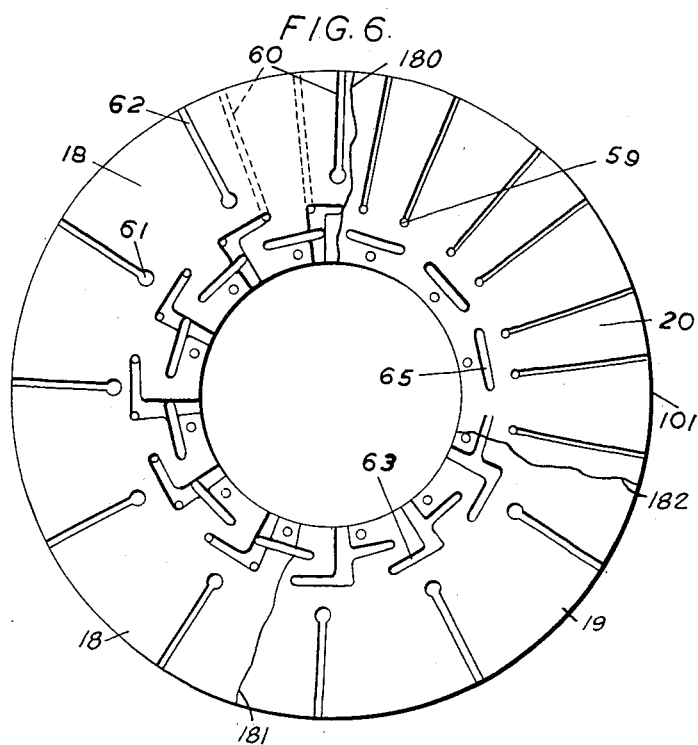
Figure 6 is a view of the assembled spinner plate.

The central spinner plate 20 is a steel plate provided with a number of the holes 59 and slots 60 through which oil can pass at all times for cooling purposes and with slots 65 to provide resilience near the inner periphery of the plate. The spinner facing plates 18, 19 are made of steel and may be faced with a hard chromium deposit and have slots 62 the ends of which are drilled at 61 and also slots 63, the latter providing resilience at the inner periphery of the plate and mating with the holes 59 to provide entry of oil to the holes 59. Fig. 3 shows the friction linings 18 and 19 for the spinner plate assembly in solid lines. The broken lines in Fig. 3 show the relative positions of other structure in the assembled clutch. The line 100 shows the relative position of the radially inner peripheral edge of the driving friction liner 27 shown more clearly in Figs. 1 and 2. At 59 and 60 are shown the relative positions of the holes and slots of the center driven supporting disc 20, shown completely in Fig. 5. Fig. 6 is an axial view of the complete spinner plate with portions broken away. The nearest friction facing 18 is broken away at 180 to reveal the central supporting disc 20, the latter being also broken away at 182 to show the further plate 19. At 181, both the facing 18 and disc 20 are broken away to reveal the further plate 19.

When fluid pressure from the pump is built up in the space 34 and the friction surfaces are brought into engagement all the circulating fluid will tend to pass through grooves 33 formed in the plate 24, and through the holes 59 and slots 60 in the spinner centre plate 20.

When the clutch is engaged excess oil on the friction surfaces is rapidly removed through the drillings 61 and slots 62. The drillings 61 are arranged at a greater diameter than the inner diameter of the facings 27, 28, and are therefore not open to the circulating oil during engagement. The slots 62 provide openings across the greater part of the friction surfaces between the inner and outer peripheries of the driving friction plate 16—27 indicated at 100, 101, respectively and lead to the outer periphery where the oil escapes.

Between the inner friction periphery 100 and the holes 61 the friction surfaces are unbroken so as to seal off the friction surfaces against entry of oil to the friction surfaces at the inner periphery. The slots 62 exhaust oil from the friction faces but do not provide openings to lead oil to the friction surfaces. It will be observed from Figure 3 that the slots 60 of the plate 20 which pass the circulating oil are staggered in relation to the slots 62 of the plates 18, 19.

In an alternative construction the friction facings 18, 19, are omitted and the facings 27, 28 are rivetted to the plate 20 instead of to the plates 16, 24 and grooves are formed in the friction facings as shown in Figure 4. In this construction the holes 61 may be omitted or replaced by an annular groove 64. In both constructions the facings 27, 28 are made from an asbestos base material.

In both constructions the slots or grooves are provided which extend across the greater part of the friction surfaces and lead to the outer periphery but not to the inner periphery, smooth unbroken surfaces being provided near the inner diameter to prevent or restrict entry of oil when the surfaces are pressed into contact. In both constructions fluid can circulate through the parts of the clutch for cooling but without coming into contact with the friction surfaces.

I claim:

1. A friction engaging device comprising first and second friction members provided with co-acting lubricated friction surfaces, located in adjacent flat planes and at least one of which is constituted by asbestos base friction material and the friction surface of said first friction member being channelled by a plurality of lubricant channels which extend across the greater part of the friction surface between its outer and inner peripheries and lead to the outer periphery but not to the inner periphery, smooth unbroken surfaces being provided near the inner periphery, and the friction surface of said second friction member co-acting with said channelled surface being large enough to extend inwardly beyond the inner ends of the channels and having a smooth unbroken surface co-acting with the smooth unbroken surface of the friction surface of the first friction member, means being provided to permit free escape of oil from the periphery of the surfaces, means to supply oil by pressure to the friction surfaces in a direction to reach the parts of smaller diameter first and in sufficient quantity when all the friction surfaces are declutched to lubricate the friction surfaces, and an oil escape path adjacent the inner peripheries large enough in relation to the oil supply so as at all times to prevent an accumulation of a bulk of oil adjacent to the inside edges of the friction surfaces, whereby when the friction surfaces are pressed into contact entry of lubricant at the inner diameter is restricted and lubricant on the surface is wiped off and expelled through said channels.

2. A friction engaging device as claimed in claim 1 in which the first friction member is a spinner plate provided with two friction facings, both provided with said channels, and said oil escape path comprises ducts provided between the facings, which ducts lead from a position of smaller diameter than the inner periphery of the friction surfaces to the outer periphery to permit passage of lubricant therethrough for cooling and escape.

3. A friction engaging device as claimed in claim 1 in which the first friction member is a spinner plate comprising a central plate provided with two friction facings, one on each of the opposite sides of the central plate, said friction facings being each provided with said channels, and said oil escape path comprises ducts provided in the central plate, which ducts communicate at their inner ends with holes in the central plate and lead from a position of smaller diameter than the inner periphery of the friction surfaces to the outer periphery to permit passage of lubricant therethrough to permit cooling.

4. A friction engaging device as claimed in claim 1 in which the first friction member is a spinner plate comprising a central plate provided with two friction facings, one on each of the opposite sides of the central plate, said friction facings being each provided with said channels, and said oil escape path comprises ducts provided in the central plate, which ducts communicate at their inner ends with holes in the central plate and lead from a position of smaller diameter than the inner periphery of the friction surfaces to the outer periphery to permit passage of lubricant therethrough to permit cooling, said ducts being staggered with respect to the channels in the linings viewed in the axial direction.

HOWARD FREDERICK HOBBS.

References Cited in the file of this patent

UNITED STATES PATENTS

| Number | Name | Date |
| --- | --- | --- |
| 795,974 | Hele-Shaw | Aug. 1, 1905 |
| 986,324 | Sutherland et al. | Mar. 7, 1911 |
| 1,843,987 | Ragan | Feb. 9, 1932 |
| 1,912,716 | Lane | June 6, 1933 |
| 2,097,710 | Whitelaw et al. | Nov. 3, 1937 |
| 2,107,954 | Morton et al. | Feb. 8, 1938 |
| 2,370,360 | McLean et al. | Feb. 27, 1945 |
| 2,437,670 | Adamson | Mar. 16, 1948 |
| 2,439,849 | Fawick | Apr. 20, 1948 |
| 2,467,830 | Hornbostel | Apr. 19, 1949 |
| 2,512,360 | McLean | June 20, 1950 |